(12) United States Patent
Gill et al.

(10) Patent No.: US 10,875,653 B2
(45) Date of Patent: Dec. 29, 2020

(54) AIRCRAFT CABIN ARRANGEMENT OPTIMISED FOR THE INSTALLATION OF SEATS FOR THE FLIGHT CREW

(71) Applicant: Safran Seats, Plaisir (FR)

(72) Inventors: Alison Gill, Toulouse (FR); Brice Lebegue, Issoudun (FR); Alexandre Mesaros, Issoudun (FR); Jérôme Verbeque, Colomiers (FR); Claude Martin, Lury sur Arnon (FR)

(73) Assignee: Safran Seats, Plaisir (FR)

( * ) Notice: Subject to any disclaimer, the term of this patent is extended or adjusted under 35 U.S.C. 154(b) by 333 days.

(21) Appl. No.: 15/762,047

(22) PCT Filed: Sep. 22, 2016

(86) PCT No.: PCT/EP2016/072567
§ 371 (c)(1),
(2) Date: Mar. 21, 2018

(87) PCT Pub. No.: WO2017/050912
PCT Pub. Date: Mar. 30, 2017

(65) Prior Publication Data
US 2018/0273185 A1 Sep. 27, 2018

Related U.S. Application Data

(60) Provisional application No. 62/221,832, filed on Sep. 22, 2015.

(51) Int. Cl.
*B64D 11/06* (2006.01)
*B64D 11/04* (2006.01)

(52) U.S. Cl.
CPC .......... *B64D 11/0691* (2014.12); *B64D 11/04* (2013.01); *B64D 11/0602* (2014.12);
(Continued)

(58) Field of Classification Search
CPC ............ B64D 11/0691; B64D 11/0602; B64D 11/0606; B64D 11/0627; B64D 11/064
See application file for complete search history.

(56) References Cited

U.S. PATENT DOCUMENTS 3,898,704 A * 8/1975 Gallaher .............. A47C 19/205
5/2.1
2008/0302911 A1 12/2008 Warner et al.
(Continued)

FOREIGN PATENT DOCUMENTS

DE 102007012376 9/2008
DE 102007019341 * 11/2008
(Continued)

OTHER PUBLICATIONS

International Patent Application No. PCT/EP2016/072567, Written Opinion of the International Searching Authority (including English translation), dated Nov. 8, 2016.
(Continued)

*Primary Examiner* — Justin M Benedik
(74) *Attorney, Agent, or Firm* — Kilpatrick Townsend & Stockton LLP

(57) ABSTRACT

An aircraft cabin arrangement includes at least one cabin attendant seat, called a high-comfort seat, which can assume a stowed position, a sitting position and at least one rest position, and at least one furniture unit. The high-comfort seat is installed in a space provided in the furniture unit, or can extend at least partially into a space arranged in the furniture unit when said high-comfort seat is in the rest position.

19 Claims, 6 Drawing Sheets

(52) U.S. Cl.
CPC ........ *B64D 11/064* (2014.12); *B64D 11/0606* (2014.12); *B64D 11/0627* (2014.12); *B64D 11/0643* (2014.12); *B64D 11/0646* (2014.12); *B64D 11/0604* (2014.12)

(56) References Cited

U.S. PATENT DOCUMENTS

| | | |
|---|---|---|
| 2010/0140400 A1 | 6/2010 | Helfrich et al. |
| 2013/0126671 A1 | 5/2013 | Guering |
| 2014/0209741 A1 | 7/2014 | Boenning et al. |
| 2014/0252830 A1 | 9/2014 | Johnson et al. |

FOREIGN PATENT DOCUMENTS

| | | |
|---|---|---|
| EP | 2574551 | 4/2013 |
| EP | 2724938 | 4/2014 |

OTHER PUBLICATIONS

International Patent Application No. PCT/EP2016/072567, International Search Report (including English translation) and Written Opinion, dated Nov. 8, 2016.

\* cited by examiner

Fig.1a  Fig.1b

AIRCRAFT CABIN ARRANGEMENT OPTIMISED FOR THE INSTALLATION OF SEATS FOR THE FLIGHT CREW

CROSS-REFERENCE TO RELATED APPLICATIONS

This application is a national phase entry under 35 USC § 371 of International Application PCT/EP2016/072567 ("the '567 application"), filed Sep. 22, 2016, and entitled AIRCRAFT CABIN ARRANGEMENT OPTIMISED FOR THE INSTALLATION OF SEATS FOR THE FLIGHT CREW, which claims priority to and benefits of U.S. Provisional Application No. 62/221,832 ("the '832 application"), filed on Sep. 22, 2015, and entitled HIGH COMFORT CABIN ATTENDANT SEAT - IMPROVED LAYOUT. The '832 application and the '567 application are hereby incorporated in their entireties by this reference.

FIELD OF THE INVENTION

The present invention relates to an aircraft cabin arrangement optimised for the installation of cabin attendant seats. The invention has a particularly advantageous, but not exclusive, application in the layout of single-aisle aircraft cabins.

BACKGROUND

New regulations extend the scope of application of the limitation of flight time working hours of airline cabin attendants (or ACA) to medium- and short-haul operators. However, these regulations permit an extension of flight time working hours beyond the set limit if specific installations enabling flight crew to rest are made available and used for a specified duration.

In order to meet this need that existed previously on long-haul twin-aisle aircraft, two solutions have been adopted, namely either the use of High Comfort Cabin Attendant Seats (HCCAS) or the arrangement of Lower Deck Mobile Crew Rest (LDMCR) areas.

As less lower deck space is available on single-aisle aircraft, the only feasible option is to install high-comfort seats. However, this solution has the drawback of reducing the number of seats available for passengers.

SUMMARY OF THE INVENTION

This invention therefore aims to facilitate the incorporation of high-comfort cabin attendant seats while minimizing the impact on the density of passenger seats in the cabin.

To this end, the subject matter of the invention relates to an aircraft cabin arrangement comprising:
 at least one cabin attendant seat, called a high-comfort seat, which can assume a stowed position, a sitting position and at least one rest position, and
 at least one furniture unit, characterized in that said high-comfort seat is installed in a space provided in the furniture unit, or can extend at least partially into a space arranged in the furniture unit when said high-comfort seat is in the rest position.

Thanks to the occupation by the high-comfort seat of a space present in the furniture unit, the invention thus limits the number of passenger seats to be eliminated to a minimum when installing high-comfort seats in the aircraft cabin.

According to one embodiment, the furniture unit is chosen specifically from one of the following units: a galley module, a sanitary module or a storage module.

According to one embodiment, the high-comfort seat is physically separated from a passenger-dedicated area.

According to one embodiment, in the case of an installation at the forward end of the cabin, the furniture unit comprises:
 two foot-rests for adjacent passenger seats, and
 one standard cabin attendant seat that can assume a stowed position and a sitting position, said standard cabin attendant seat being positioned between two storage compartments,
so that the high-comfort seat extends at least partially into the space in the furniture unit between the two storage compartments when the high-comfort seat is in the rest position and the standard cabin attendant seat is in the stowed position.

According to one embodiment, in the case of an installation at the forward end of the cabin, a standard cabin attendant seat is fixed to a sanitary module, the furniture unit comprising:
 two foot-rests for the adjacent passenger seats,
 one high-comfort seat, specifically facing forward,
 two storage compartments, one on either side of the high-comfort seat.

According to one embodiment, the furniture unit also comprises:
 a retractable partition extending along an aisle to ensure a direct view in the sitting position, and/or
 a curtain between the sanitary module and the furniture unit on an aisle side to enable the high-comfort seat to be isolated.

According to one embodiment, in the case of an installation in the middle of the cabin, a rest module, ensuring a separation between business class and economy class, comprises:
 one forward partition and one aft partition to ensure isolation of the rest module,
 two high-comfort seats positioned side by side,
 one curtain or mobile partition providing separation from an aisle of the cabin, and
 one curtain or mobile partition providing separation between the two high-comfort seats.

According to one embodiment, in the case of an installation in the middle of the cabin, a rest module, ensuring the separation between business class and economy class, comprises:
 a forward partition and an aft partition to ensure isolation of the rest module,
 a high-comfort seat facing forward or aft on a fuselage side, and
 an auxiliary module mounted on an aisle side.

According to one embodiment, the auxiliary module is chosen from one of the following modules: a sanitary module, a galley module, a storage compartment or a self-service module.

According to one embodiment, in the case of an installation at the aft end of the cabin, the high-comfort seat located near an aft door can extend at least partially into a space arranged in part of a galley module.

According to one embodiment, in the case of an installation at the aft end of the cabin, a so-called hybrid module comprises:
 a first part incorporating a galley module, and
 a second part incorporating two high-comfort seats separated from one another by a partition or a curtain.

According to one embodiment, the high-comfort seat comprises an extendable seat bottom, a back that can be inclined by up to 45 degrees relative to the vertical, a leg-rest and a foot-rest that can be extended relative to the leg-rest.

Clearly, the different characteristics, variations and/or embodiments of the present invention can be associated together in various combinations provided that they are not mutually incompatible or exclusive.

BRIEF DESCRIPTION OF THE DRAWINGS

A better understanding of the present invention and further features and advantages thereof will emerge from the following detailed description comprising embodiments given by way of example with reference to the accompanying Figures, provided by way of non-limiting examples, which can be used to complete the understanding of the present invention and the presentation of its embodiment and, if necessary, contribute to its definition, in which:

FIGS. 1a to 1c are perspective views showing the different positions of a high-comfort cabin attendant seat incorporated into the cabin arrangements according to the invention;

FIG. 2b is a detailed view of the furniture unit connected to the seat shown in the arrangement of FIG. 2a;

FIG. 3b is a detailed view of a furniture unit connected to the seat shown in the arrangement of FIG. 3a;

DETAILED DESCRIPTION

Figure 1C:
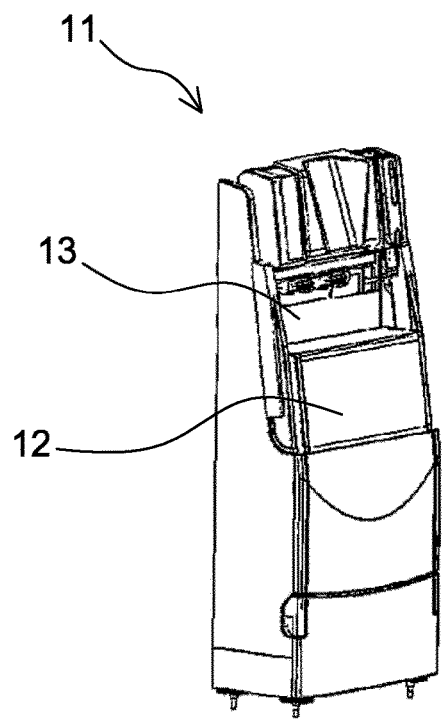
Figure 1C:
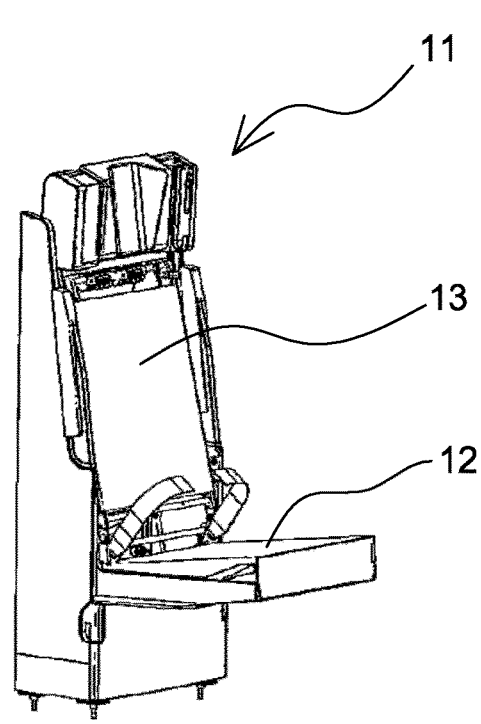
Figure 1C:
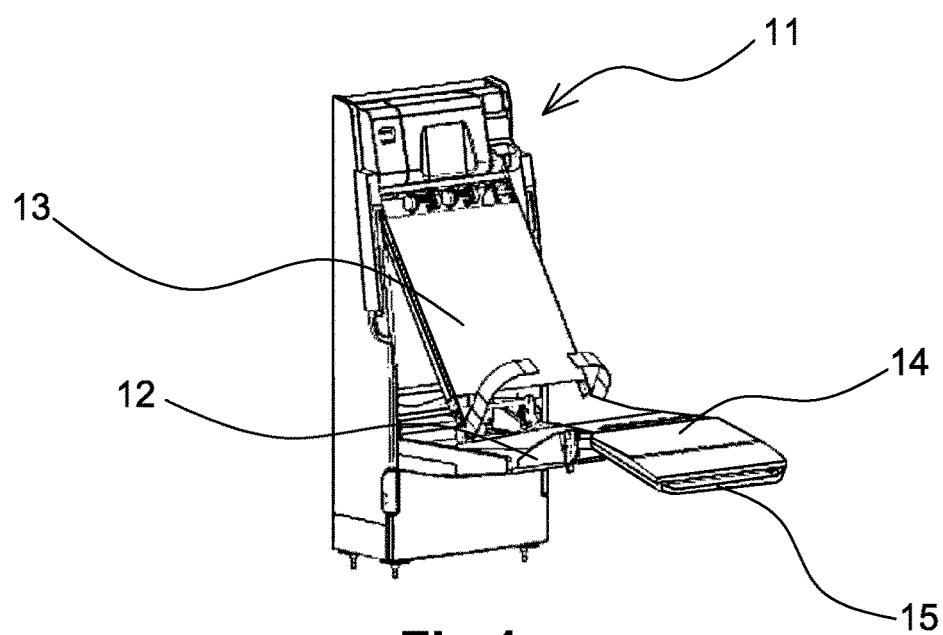

Note that, in the Figures, structural and/or functional elements common to the different embodiments can bear the same reference numerals. Thus, unless stated otherwise, such elements have identical structural, dimensional and physical properties.

In the rest of the description, the terms "forward facing" and "aft facing" define an orientation of the seats inside the aircraft cabin, meaning that a "forward facing" element faces the aircraft cockpit and an "aft facing" element faces in the opposite direction. The aircraft's direction of travel corresponds to direction D in the Figures. The "forward" part of the cabin is located at the cockpit end while the "aft" part of the cabin is located at the opposite end. Furthermore, the terms "starboard" and "port" are understood to have the common meaning that would be given to these terms by a person located inside the cabin and looking towards the front of the cabin in direction D.

FIGS. 2a, 3a, 4a, 4b, 4c, 5a and 5b show an arrangement of an aircraft cabin 10 comprising at least one cabin attendant seat, called a high-comfort seat 11. As shown in FIGS. 1a, 1b and 1c, this high-comfort seat 11 preferably comprises an extendable seat bottom 12, a back 13 and a leg-rest 14, which can be provided with a foot-rest 15 that can be extended relative to the leg-rest 14.

The seat 11 has kinematics that allow it to move between a stowed position in which the seat bottom 12 is folded against the seat back 13 to leave the area around the seat clear, as shown in FIG. 1a, a sitting position complying with safety regulations during aircraft taxiing, take-off and landing phases (known as the "Taxi, Take-Off, Landing" or TTL position), as shown in FIG. 1b, and at least one rest position in which the back 13 is inclined relative to the vertical and the leg-rest 14 supports the user's legs.

The seat 11 can for example assume eight separate rest positions in which the relative angles of inclination of the different elements are different. The back 13 can be inclined by up to 45 degrees relative to the vertical. The seat 11 can be maneuvered by means of a handle to pass from one position to the other. Advantageously, the seat returns to the stowed position in an assisted manner.

According to the invention, the high-comfort seat 11 is connected to a furniture unit 18. The seat 11 can fit into in a space 21 provided within the furniture unit 18 when the seat is in the rest position. The furniture unit is chosen from one of the following units: a galley module 24, a sanitary module 25, a storage module, or any other module suited to the application.

Note that a galley module 24 is a furniture unit chiefly comprising trolleys 28, storage spaces and equipment to enable food to be cooked or heated up. One important characteristic of the galley module 24 is the number of storage trolleys 28 or half-trollies 28' that it can contain, because the airline companies need to have a certain number of trolleys that depends on the capacity of the aircraft.

The sanitary module 25 specifically comprises toilets, a washbasin and a bin. Advantageously, the high-comfort seat 11 is physically separated from the passenger-dedicated area so as to be located in an area of the cabin 10 in which noise and light intensity are limited.

There now follows a description, with reference to FIGS. 2 to 5, of the incorporation of the high-comfort seat 11 inside a single-aisle aircraft cabin, in other words with a single aisle bearing reference numeral 31. Clearly, the invention can also be implemented for twin-aisle cabins. In the Figures, the X axis corresponds to the longitudinal axis of elongation of the aircraft.

Figure 2A:
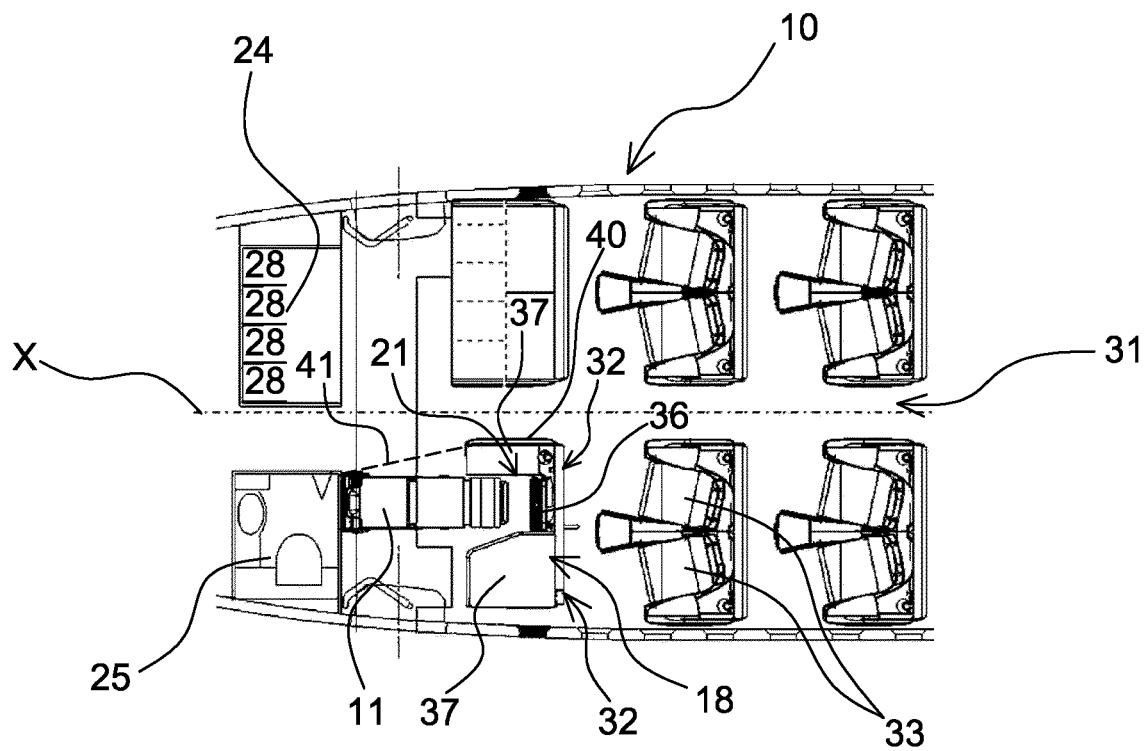
FIG. 2a is a view showing a first embodiment of the arrangement according to the invention in the case of an installation at the forward end of the aircraft cabin.

As shown in FIG. 2a, in the case of an installation at the forward end of the cabin 10, the high-comfort seat 11 is fixed to a wall of a sanitary module 25.

The furniture unit 18 incorporates two foot-rests 32 on its rear face for the adjacent passenger seats 33. Furthermore, a standard cabin attendant seat 36 is located between two storage compartments 37. Such a standard seat 36 is capable of assuming a stowed position and a sitting position, but does not have a rest position, as does the high-comfort seat 11. The standard seat 36 is positioned opposite the high-comfort seat 11. As a variation, the seats 11 and 36 can be offset relative to one another in a transverse direction perpendicular to the X axis.

Figure 2B:
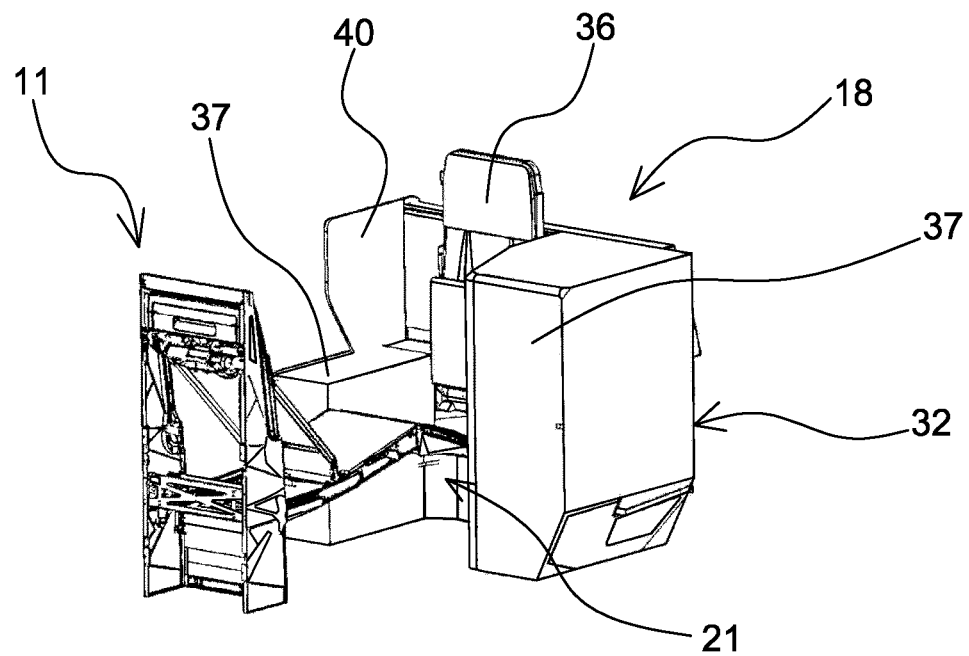

As can be seen in FIG. 2b, the high-comfort seat 11 extends at least partially into the space 21 of the furniture unit 18 delimited by the two walls facing the storage compartments 37 when the high-comfort seat 11 is in the rest position and the standard seat 36 is in the stowed position. The two cabin attendant seats 11 and 36 that face each other can be used simultaneously in the sitting position.

The furniture unit 18 also comprises a retractable partition 40 extending along the aisle to ensure that the person occupying the high-comfort seat 11 has a direct view, in other words an unobstructed view of the aisles and cabin 10 when seated. According to regulations, the cabin attendant's direct view of the passengers allows him/her to check that the latter are safe. This direct view must cover at least 50% of each passenger class.

Furthermore, a curtain 41, represented by a dotted line in FIG. 2a, can be drawn between the sanitary module 25 and the furniture unit 18 on the aisle side 31. This curtain 41 allows the high-comfort seat 11 to be isolated during rest phases.

Such a configuration allows the number of passenger seats to remain unchanged while keeping a sufficient number of cabin attendant seats that can be used in the seated position.

According to a variation, the furniture unit 18 has no standard cabin attendant seat 36 and incorporates a foot-rest independent of the high-comfort seat 11. It will also be possible to fill the spaces located around the foot-rest located in the furniture unit 18 with additional storage areas.

Figure 3A:
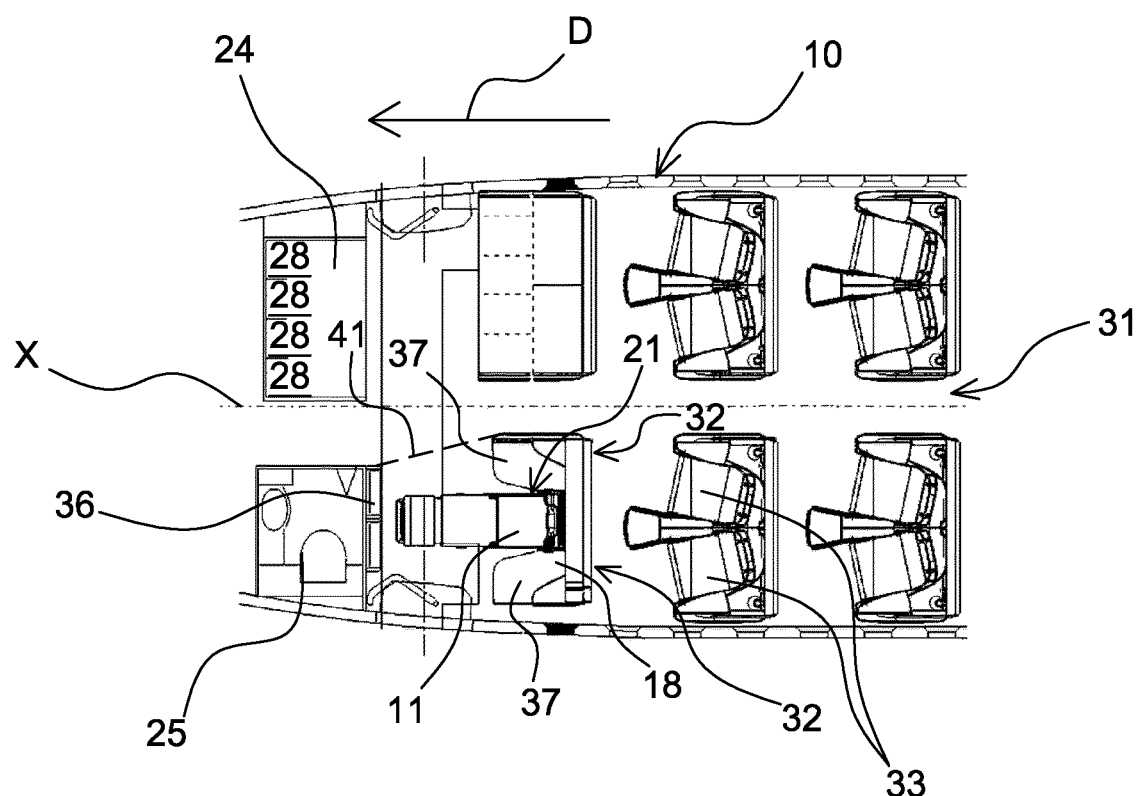
FIG. 3a is a view showing a second embodiment of the arrangement according to the invention in the case of an installation at the forward end of the aircraft cabin.

FIG. 3a shows a second possible arrangement in the case of an installation of the seat 11 at the forward end of the cabin 10. According to this arrangement 10, a standard cabin attendant seat 36 is fixed to a sanitary module 25. This standard seat 36 can be single or double, in other words can comprise one or two seat bottoms 12 to accommodate two people.

Figure 3B:
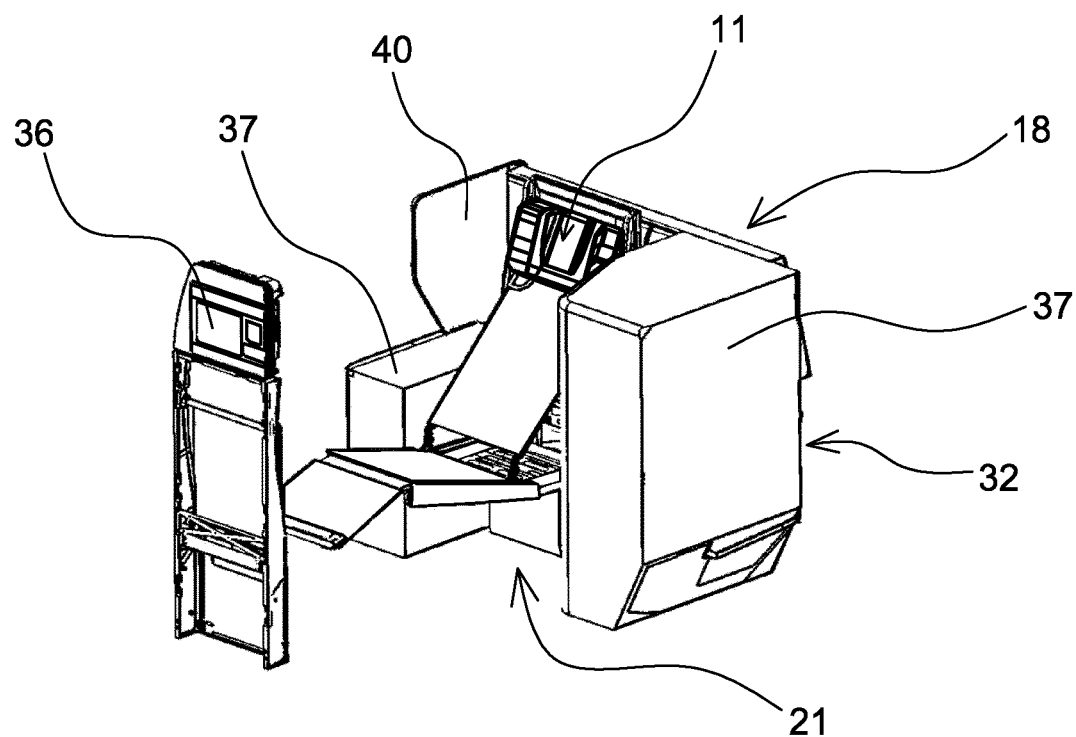

Moreover, the furniture unit 18 comprises two foot-rests 32 for the adjacent passenger seats, and one high-comfort seat 11 facing forward. As can be seen in FIG. 3b, two storage compartments 37 are provided on either side of the high-comfort seat 11. In other words, the high-comfort seat 11 is located in the space 21 between the two storage compartments 37, which limits the overall dimensions of the unit.

The high-comfort seat 11 is positioned opposite the standard cabin attendant seat 36. The high-comfort seat can thus assume a rest position when the standard seat 36 is in the stowed position. As a variation, the seats 11 and 36 can be offset relative to one another in a transverse direction perpendicular to the X axis.

The furniture unit 18 also comprises a retractable partition 40 extending along the aisle 31 to ensure that a person occupying the standard seat has a direct view of the aisles and cabin in the sitting position. Furthermore, a curtain 41, represented by a dotted line in FIG. 3a, can be drawn between the sanitary module 25 and the furniture unit 18 on the aisle side 31. This curtain 41 allows the high-comfort seat 11 to be isolated during rest phases.

Figure 4A:
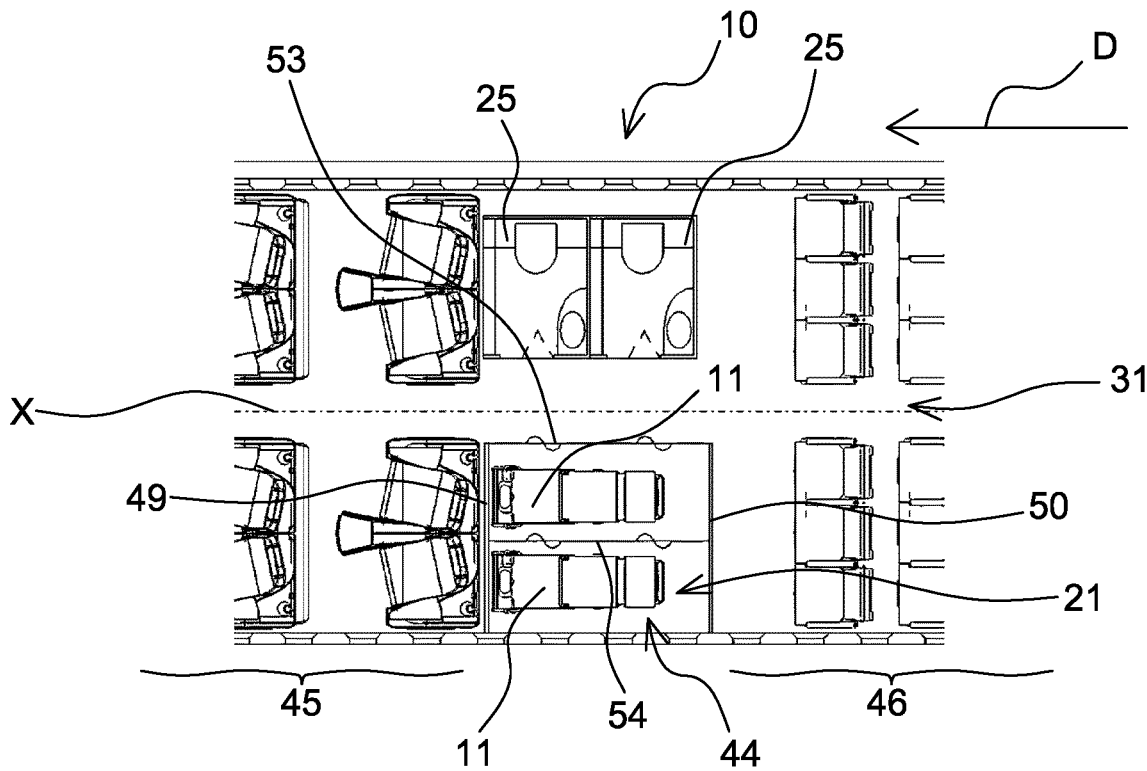
FIGS. 4a to 4c are views showing three embodiments of the arrangement according to the invention in the case of an installation in the middle of the aircraft cabin.

As shown in FIG. 4a, in the case of an installation in the middle of the cabin, a rest module 44 provides a separation between business class 45 and economy class 46. This module 44 comprises a forward partition 49 and an aft partition 50 to ensure the isolation of the module 44 relative to the sound and light environment of the cabin.

Moreover, two high-comfort seats 11 are positioned side by side in the space 21 delimited by the partitions 49 and 50. These seats 11 are represented as facing aft but, as a variation, can face forward.

Also, preferably a curtain or a movable partition 53 is provided, ensuring separation from the aisle 31 of the cabin 10, as well as a curtain or movable partition 54 ensuring separation between the two high-comfort seats 11.

This configuration dictates, however, that 12 passenger seats must be eliminated from the middle of the cabin and six must be recovered at the end of the cabin by relocating two sanitary modules 25 opposite the rest module 44. This configuration is particularly suitable when two or more high-comfort seats 11 are required since no modification of the aft galley module 24 is necessary.

Figure 4B:
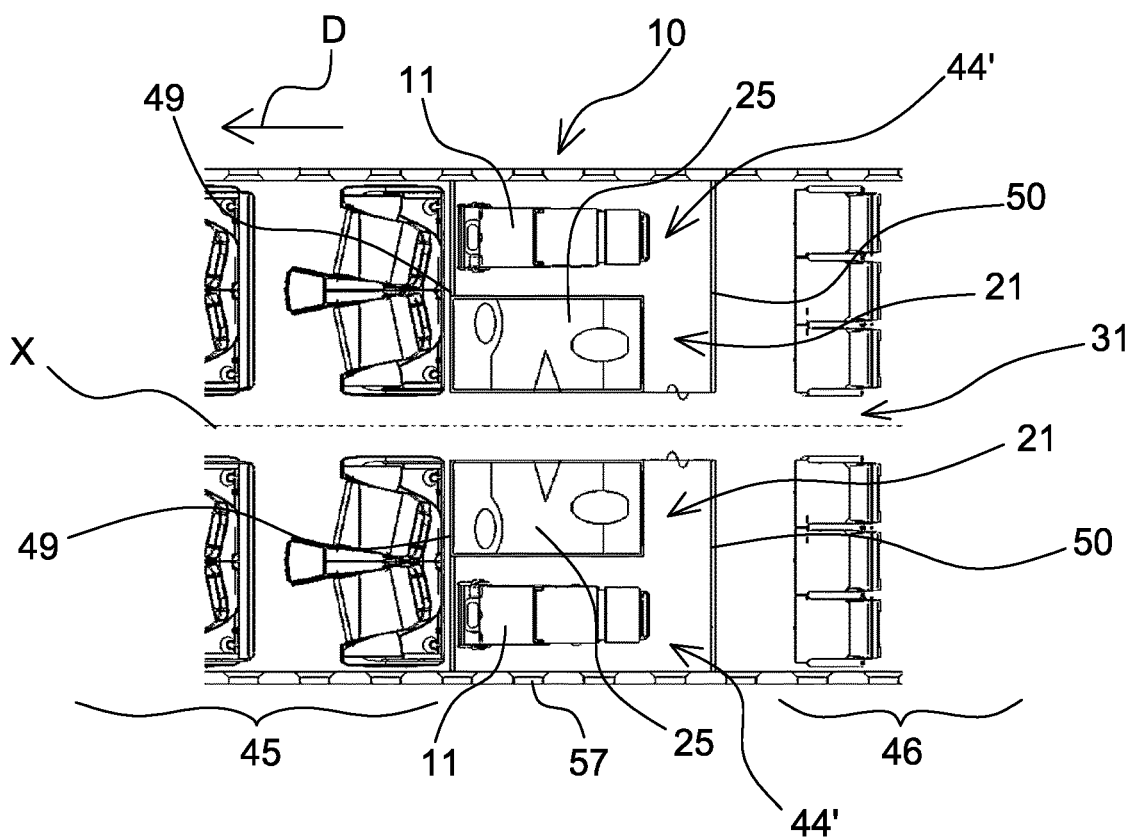

In the embodiment shown in FIG. 4b, a rest module 44' ensures the separation between business class 45 and economy class 46. This rest module 44' comprises a forward partition 49 and an aft partition 50 to ensure isolation of the module 44' relative to the sound and light environment of the cabin 10.

Inside the space 21 delimited by the partitions 49, 50, a high-comfort seat 11 is mounted facing aft on the fuselage side 57, and a sanitary module 25 is mounted on the aisle side 31. In this case, two rest modules 44' are used, positioned inside the cabin 10 symmetrically to the X axis.

Such a configuration requires that six passenger seats are eliminated per module in the middle of the cabin and, if necessary three are recovered at the end of the cabin.

Figure 4C:
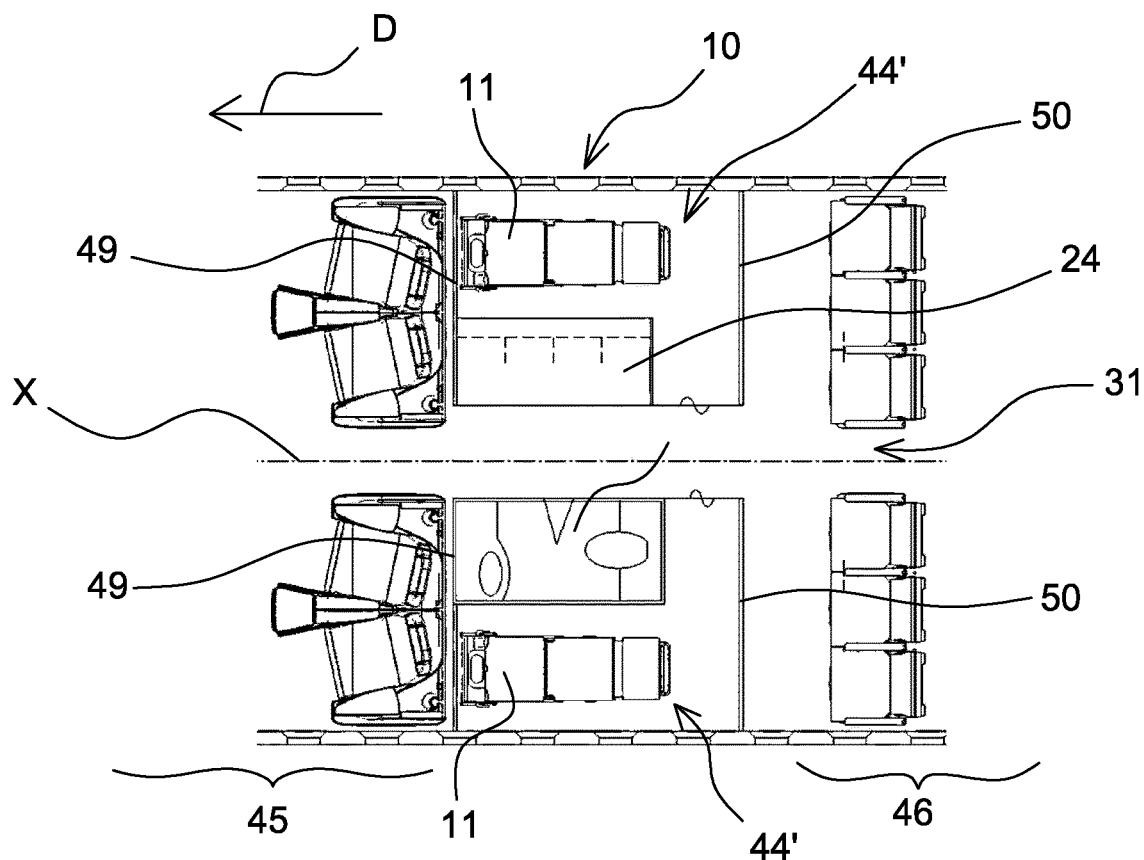

In the embodiment shown in FIG. 4c, the starboard sanitary module 25 is replaced by a galley module 24. As a variation, the high-comfort seat 11 can be associated with a storage compartment or a dispenser of drinks and food products.

Figure 5A:
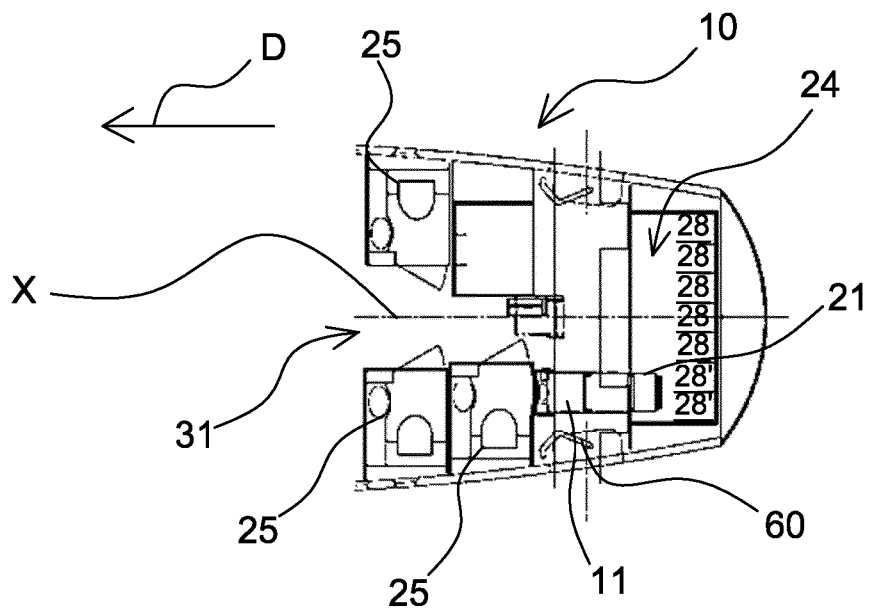
FIGS. 5a and 5b are views showing two embodiments of the arrangement according to the invention in the case of an installation at the aft end of the aircraft.

As shown in FIG. 5a, in the case of an installation at the aft end of the cabin 10, a high-comfort seat 11 facing aft and located near an aft door 60 can extend at least partially into a space 21 arranged in a part of a galley module 24.

For this purpose, the space 21 can be obtained by placing, for example, two half-trolleys 28' in spaces adapted to receive full trolleys 28, the difference between the volume occupied by the half-trolleys 28 and the space available defining a free volume enabling at least part of the high-comfort seat 11 to be received when the latter is in the rest position. The galley module 24 can for example comprise five trolleys 28 and two half-trolleys 28'.

Figure 5B:
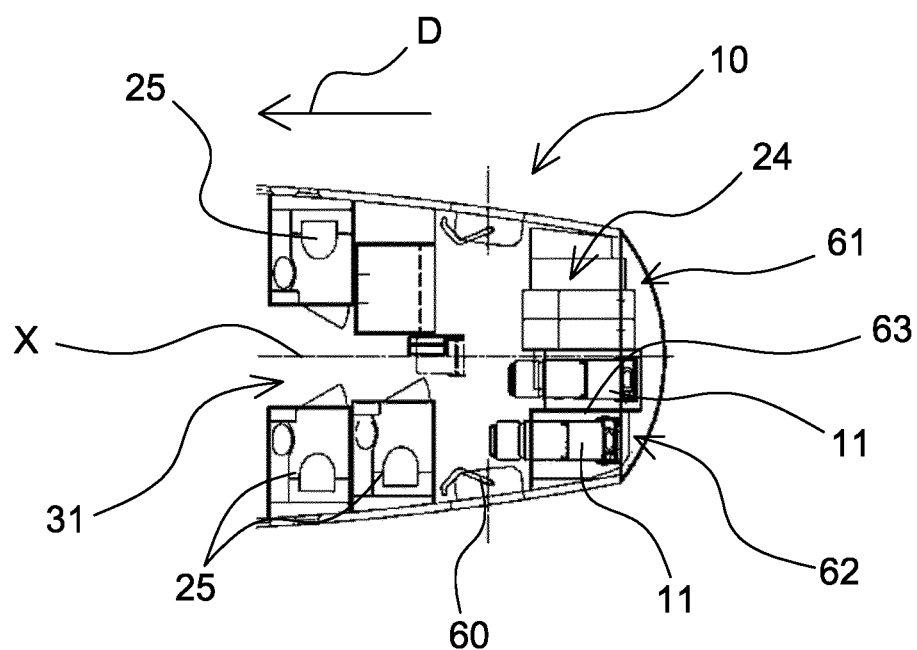

In the embodiment shown in FIG. 5b, a hybrid module located at the aft end of the cabin 10 comprises a starboard part 61 incorporating a galley module 24 and a port part 62 incorporating two high-comfort seats 11 separated from one another by a partition 63. As a variation, the partition 63 can be replaced by a curtain.

Such a configuration requires two sanitary modules 25 eliminated at the aft end of the cabin to be relocated in the middle of the cabin 10, for example to ensure the separation between two areas of the cabin, for example between business class 45 and economy class 46.

Clearly, the invention is not limited by the embodiments previously described and provided purely by way of example. It encompasses different modifications, alternative forms and other variations that a person skilled in the art of the present invention can envisage and, in particular, all of the combinations of the different operating modes described above, can be taken separately or in combination.

The invention claimed is:

1. An aircraft cabin arrangement comprising:
at least one high-comfort seat wherein the at least one high-comfort seat is movable between a stowed position, a sitting position and at least one rest position, and
at least one furniture unit,
wherein the at least one high-comfort seat is installed in a space provided in the at least one furniture unit, or can extend at least partially into the space arranged in the at least one furniture unit when said at least one high-comfort seat is in the rest position, wherein the at least one furniture unit comprises:
two foot-rests for of adjacent passenger seats, and
a standard cabin attendant seat that is movable between a stowed position and a sitting position, wherein the standard cabin attendant seat is positioned between two storage compartments such that the at least one high-comfort seat extends at least partially into the space in the at least one furniture unit between the two storage compartments when the at least one high-comfort seats in the at least one rest position and the standard cabin attendant seat is in the stowed position.

2. The arrangement according to claim 1, wherein the at least one furniture unit is chosen from one of the following units: a galley module, a sanitary module or a storage module.

3. The arrangement according to claim 1 wherein the at least one high-comfort seat is physically separated from a passenger-dedicated area.

4. The arrangement according to claim 1, wherein the standard cabin attendant seat is fixed to a sanitary module, and wherein the furniture unit comprises:
the two foot-rests of the adjacent passenger seats,
the at least one high-comfort seat facing forward, and
the two storage compartments, one on either side of the at least one high-comfort seat.

5. The arrangement according to claim 1, wherein the at least one furniture unit further comprises:
a retractable partition extending along an aisle to ensure a direct view in the sitting position, and
a curtain between a sanitary module and the at least one furniture unit on an aisle side to enable the at least one high-comfort seat to be isolated.

6. The arrangement according to claim 1, further comprising a rest module, wherein the rest module comprises:
one forward partition and one aft partition to ensure isolation of the rest module,
the at least one high-comfort seat having two high-comfort seats positioned side by side,
one mobile partition providing separation from an aisle of the cabin, and
one mobile partition providing separation between the two high-comfort seats.

7. The arrangement according to claim 1, further comprising a rest module, wherein the rest module comprises:
a forward partition and an aft partition to ensure isolation of the rest module,
the at least one high-comfort seat facing forward or aft, and
an auxiliary module mounted on an aisle side.

8. The arrangement according to claim 7, wherein the auxiliary module is chosen from one of the following modules: a sanitary module, a galley module, a storage compartment or a self-service module.

9. The arrangement according to claim 1, wherein the at least one high-comfort seat is at least partially extendable into a space arranged in part of a galley module.

10. The arrangement according to claim 1, further comprising a hybrid module, wherein the hybrid module comprises:
a first part incorporating a galley module, and
a second part incorporating two of the at least one high-comfort seat separated from one another by a partition or a curtain.

11. The arrangement according to claim 1, wherein the at least one high-comfort seat comprises an extendable seat bottom, a back that can be inclined by up to 45 degrees relative to the vertical, a leg-rest, and a foot-rest that can be extended relative to the leg-rest.

12. An aircraft cabin arrangement comprising:
at least one high-comfort seat wherein the at least one high-comfort seat is movable between a stowed position, a sitting position and at least one rest position, and
at least one furniture unit, wherein the at least one high-comfort seat is installed in a space provided in the at least one furniture unit, or can extend at least partially into the space arranged in the at least one furniture unit when said at least one high-comfort seat is in the at least one rest position,
wherein the at least one furniture unit comprises:
a standard cabin attendant seat fixed to a sanitary module.
two foot-rests of adjacent passenger seats,
the at least one high-comfort seat facing forward, and
two storage compartments, one on either side of the at least one high-comfort seat such that the at least one high comfort seat extends at least partially into the space in the at least one furniture unit between the two storage compartments when the at least one high-comfort seat is in the at least one rest position and the standard cabin attendant seat is in the stowed position.

13. The arrangement according to claim 12, wherein the at least one furniture unit can be further chosen from one of the following units: a galley module, or a storage module.

14. The arrangement according to claim 12, wherein the at least one high-comfort seat is physically separated from a passenger-dedicated area and at least partially extendable into a space arranged in part of a galley module, and
wherein the at least one high comfort seat comprises an extendable seat bottom, a back that can be inclined by up to 45 degrees relative to the vertical, a leg-rest, and a foot-rest that can be extended relative to the leg-rest.

15. The arrangement according to claim 12, wherein the standard cabin attendant seat is movable between a stowed position and a sitting position, wherein the standard cabin attendant seat is positioned between the two storage compartments.

16. The arrangement according to claim 12, wherein the at least one furniture unit further comprises:
a retractable partition extending along an aisle to ensure a direct view in the sitting position, and
a curtain between a sanitary module and the at least one furniture unit on an aisle side to enable the at least one high-comfort seat to be isolated.

17. The arrangement according to claim 12, further comprising a rest module, wherein the rest module comprises:
one forward partition and one aft partition to ensure isolation of the rest module,
two of the at least one high-comfort seat positioned side by side,
one mobile partition providing separation from an aisle of the cabin, and
one mobile partition providing separation between the two high-comfort seats.

18. The arrangement according to claim 12, further comprising a rest module, wherein the rest module comprises:
a forward partition and an aft partition to ensure isolation of the rest module,
the at least one high-comfort seat facing forward or aft, and
an auxiliary module mounted on an aisle side, and
wherein the auxiliary module is chosen from one of the following modules: a sanitary module, a galley module, a storage compartment or a self-service module.

19. The arrangement according to claim 12, further comprising a hybrid module, wherein the hybrid module comprises:
a first part incorporating a galley module, and
a second part incorporating two of the at least one high-comfort seat separated from one another by a partition or a curtain.

* * * * *